(12) United States Patent
Ohata et al.

(10) Patent No.: US 11,354,265 B2
(45) Date of Patent: Jun. 7, 2022

(54) WIRING AGGREGATION APPARATUS, WIRING AGGREGATION SYSTEM, AND CONTACT INFORMATION TRANSFER METHOD

(71) Applicant: Mitsubishi Electric Corporation, Tokyo (JP)

(72) Inventors: Hiroyuki Ohata, Tokyo (JP); Satoru Ohashi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 53 days.

(21) Appl. No.: 16/612,155

(22) PCT Filed: May 23, 2017

(86) PCT No.: PCT/JP2017/019269
§ 371 (c)(1),
(2) Date: Nov. 8, 2019

(87) PCT Pub. No.: WO2018/216120
PCT Pub. Date: Nov. 29, 2018

(65) Prior Publication Data
US 2021/0133142 A1 May 6, 2021

(51) Int. Cl.
*G06F 13/42* (2006.01)
*G06F 1/16* (2006.01)
*G06F 13/12* (2006.01)

(52) U.S. Cl.
CPC ........ *G06F 13/4282* (2013.01); *G06F 1/1683* (2013.01); *G06F 13/122* (2013.01)

(58) Field of Classification Search
None
See application file for complete search history.

(56) References Cited

U.S. PATENT DOCUMENTS 6,121,906 A 9/2000 Kim
6,434,432 B1* 8/2002 Hao ................. G06F 15/78
700/1

(Continued)

FOREIGN PATENT DOCUMENTS

JP H02134938 A 5/1990
JP 2000156669 A 6/2000

(Continued)

OTHER PUBLICATIONS

International Search Report (PCT/ISA/210), with translation, and Written Opinion (PCT/ISA/237) dated Aug. 15, 2017, by the Japan Patent Office as the International Searching Authority for International Application No. PCT/JP2017/019269.

(Continued)

*Primary Examiner* — Henry Tsai
*Assistant Examiner* — Christopher A Bartels
(74) *Attorney, Agent, or Firm* — Buchanan Ingersoll & Rooney PC (57) ABSTRACT

A wiring aggregation apparatus includes at least one subunit. The subunit includes: an input/output module to output, to a control module, a first serial signal obtained by performing parallel-serial conversion on plural pieces of contact information collected from devices, and to output, to a corresponding device, each of plural pieces of contact information obtained by performing serial-parallel conversion on a second serial signal acquired from the control module; and the control module to generate a transmit frame by arranging the first serial signal acquired from the input/output module at a defined frame position, to transmit the generated transmit frame to another wiring aggregation apparatus, to extract the second serial signal arranged at a defined frame position from a receive frame acquired from the another wiring (Continued)

aggregation apparatus, and to output the extracted second serial signal to the corresponding input/output module.

10 Claims, 9 Drawing Sheets

(56) References Cited

U.S. PATENT DOCUMENTS

| | | | |
|---|---|---|---|
| 8,462,028 B2 | 6/2013 | Kashiwakura | |
| 10,840,735 B1* | 11/2020 | Cooper | H02J 3/0075 |
| 10,860,522 B2* | 12/2020 | Kung | G06F 13/4022 |
| 2004/0198291 A1* | 10/2004 | Wilcox | H04B 1/44 |
| | | | 455/269 |
| 2009/0125170 A1* | 5/2009 | Noffsinger | B60L 7/16 |
| | | | 701/20 |
| 2009/0323731 A1 | 12/2009 | Lee et al. | |
| 2011/0108677 A1* | 5/2011 | Asuka | B61L 23/14 |
| | | | 246/27 |
| 2014/0337458 A1* | 11/2014 | Barton | H04L 67/22 |
| | | | 709/213 |
| 2015/0276555 A1* | 10/2015 | Bourgoin | G01M 17/007 |
| | | | 702/122 |
| 2016/0210552 A1* | 7/2016 | Kasabov | G06N 3/088 |
| 2017/0017595 A1* | 1/2017 | Schnell | G06F 13/4022 |
| 2017/0259811 A1* | 9/2017 | Coulter | A61G 5/1089 |
| 2018/0225230 A1* | 8/2018 | Litichever | G06F 21/82 |
| 2019/0016356 A1* | 1/2019 | Mochimaru | B61L 25/025 |
| 2019/0173466 A1* | 6/2019 | Prevost | H04B 1/006 |

FOREIGN PATENT DOCUMENTS

| | | |
|---|---|---|
| JP | 2011205777 A | 10/2011 |
| JP | 2011526465 A | 10/2011 |
| KR | 100253343 B1 | 4/2000 |

OTHER PUBLICATIONS

Indian Office Action dated Feb. 10, 2021 issued by the Indian Patent Office in corresponding Indian Patent Application No. 201927045168 (5 pages).

* cited by examiner

WIRING AGGREGATION APPARATUS, WIRING AGGREGATION SYSTEM, AND CONTACT INFORMATION TRANSFER METHOD

FIELD

The present invention relates to a wiring aggregation apparatus, a wiring aggregation system, and a contact information transfer method used in a railway vehicle.

BACKGROUND

In conventional railway vehicles, contact information is transmitted and received between many devices. In a method of assigning one wire to one piece of contact information, the number of wires in the railway vehicle is increased with an increase of the contact information. As a result, a limited space in the railway vehicle is occupied by many wires and the weight of the railway vehicle is increased. Moreover, a wiring work becomes complicated. To solve these problems, Patent Literature 1 discloses a technique of constructing a network in a train and transmitting and receiving contact information via the network, thereby reducing the number of wires.

CITATION LIST

Patent Literature

Patent Literature 1: Japanese Patent Application Laid-open No. 2011-205777

SUMMARY

Technical Problem

According to the conventional technique described above, however, an address is set for each device that performs communication, and a VLAN (Virtual Local Area Network) is set in the network in the train depending on the content of communication. Therefore, every time the network configuration in the railway vehicle is changed, for example, when a device that transmits and receives contact information is increased or when the configuration of the VLAN is changed, setting is required, which is time-consuming.

The present invention has been achieved in view of the above problems, and an object of the present invention is to provide a wiring aggregation apparatus capable of transmitting and receiving contact information without performing setting while reducing or preventing an increase in the number of wires in a case where any change has been made to a connection configuration of devices in a railway vehicle.

Solution to Problem

In order to solve the above problems and achieve the object, an aspect of the present invention provides a wiring aggregation apparatus including at least one subunit. The subunit includes: at least one input/output module to output, to a control module, a first serial signal including contact information obtained by performing parallel-serial conversion on plural pieces of contact information collected from a plurality of devices, and to output, to a corresponding one of the devices, each of plural pieces of contact information obtained by performing serial-parallel conversion on a second serial signal including contact information acquired from the control module. The subunit further includes the control module to generate a transmit frame by arranging the first seral signal acquired from the input/output module at a defined frame position, to transmit the generated transmit frame to another wiring aggregation apparatus connected to the control module, to extract the second serial signal arranged at a defined frame position from a receive frame acquired from the another wiring aggregation apparatus, and to output the extracted second serial signal to the input/output module corresponding to the second serial signal.

Advantageous Effects of Invention

According to the present invention, an effect is obtained where the wiring aggregation apparatus can transmit and receive contact information without performing setting while reducing or preventing an increase in the number of wires in a case where any change has been made to a connection configuration of devices in a railway vehicle.

DESCRIPTION OF EMBODIMENTS

A wiring aggregation apparatus, wiring aggregation system, and a contact information transfer method according to embodiments of the present invention will be described in detail below with reference to the accompanying drawings. The present invention is not limited to the embodiments.

Embodiment

Figure 1:
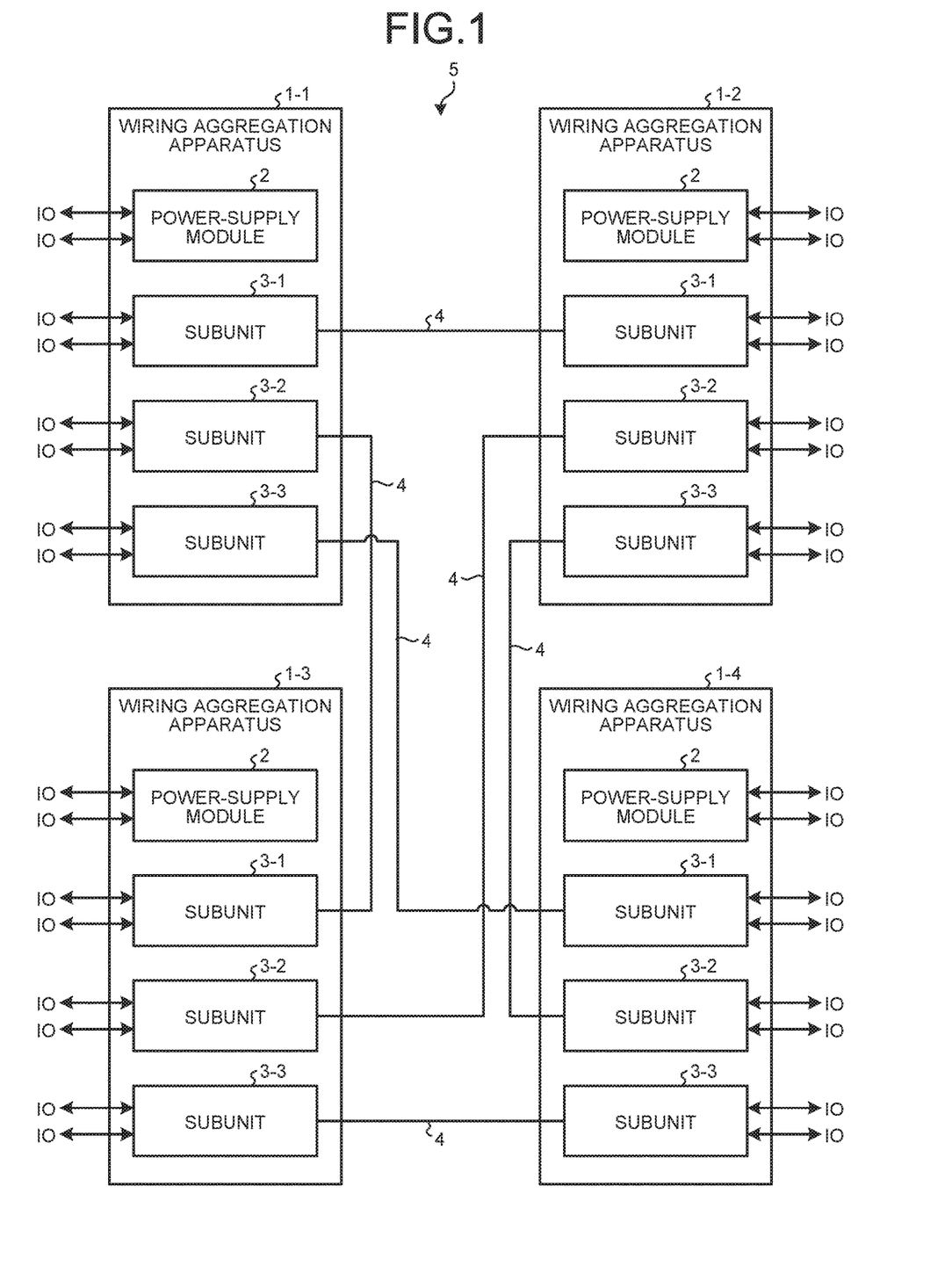
FIG. 1 is a diagram illustrating an example configuration of a wiring aggregation system.

FIG. 1 is a diagram illustrating an example configuration of a wiring aggregation system 5 according to an embodiment of the present invention. The wiring aggregation system 5 includes wiring aggregation apparatuses 1-1, 1-2, 1-3, and 1-4. The wiring aggregation apparatuses 1-1 to 1-4 have the same configuration and are referred to as "wiring aggregation apparatus (es) 1" when not particularly being distinguished from one another. Each wiring aggregation apparatus 1 is connected to the other wiring aggregation apparatuses 1 via device-to-device cables 4. Each wiring aggregation apparatus 1 includes a power-supply module 2 and subunits 3-1, 3-2, and 3-3. The subunits 3-1 to 3-3 have the same configuration and are referred to as "subunit (s) 3" when not particularly being distinguished from one another. The power-supply module 2 supplies power to the subunits 3. The number of the subunits 3 can be increased in a range where power can be supplied thereto by the power-supply module 2. Each subunit 3 is connected one-to-one to one of the subunits 3 included in the other wiring aggregation apparatuses 1 via the device-to-device cable 4.

Although each wiring aggregation apparatus 1 includes three subunits 3 in FIG. 1, this is merely an example. The number of the subunits 3 may be two or less, or four or more. That is, each wiring aggregation apparatus 1 includes one or more subunits 3. In the wiring aggregation system 5, the subunits 3 in the wiring aggregation apparatuses 1 transmit and receive contact information to and from each other. The contact information is a signal that is transmitted and received between devices installed in a railway vehicle. Examples of the devices are a cab, a door, and an air conditioner, but are not limited thereto. The device and the content of the contact information that are assumed in the present embodiment are general ones in a railway vehicle, and therefore detailed descriptions thereof are omitted. The wiring aggregation apparatus 1 is an apparatus that is used for reducing the number of wires between devices that transmit and receive contact information. Therefore, in the flow of contact information in one direction, two wiring aggregation apparatuses 1 are required between the devices that transmit and receive contact information to and from each other, which are the wiring aggregation apparatus 1 for aggregating plural pieces of contact information from a plurality of devices and the wiring aggregation apparatus 1 for converting the aggregated contact information back to the original number of pieces of contact information. In the flow of contact information in the opposite direction, the aforementioned wiring aggregation apparatus 1 for converting the aggregated contact information back to the original number of pieces of contact information serves as an apparatus that aggregates plural pieces of contact information and the aforementioned wiring aggregation apparatus 1 for aggregating contact information serves as an apparatus that converts the aggregated contact information back to the original number of pieces of contact information.

Figure 2:
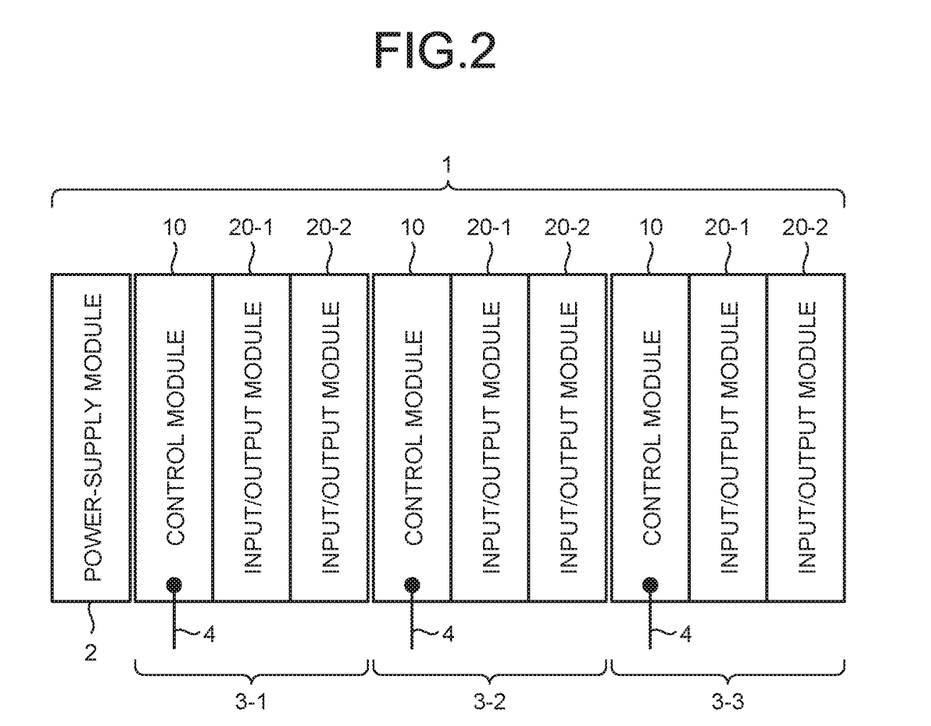
FIG. 2 is a diagram illustrating an example configuration of a wiring aggregation apparatus represented by modules.

FIG. 2 is a diagram illustrating an example configuration of the wiring aggregation apparatus 1 according to the present embodiment represented by modules. The wiring aggregation apparatus 1 includes the power-supply module 2 and the subunits 3-1 to 3-3. Each subunit 3 includes a control module 10 and input/output modules 20-1 and 20-2. The input/output modules 20-1 and 20-2 have the same configuration and are referred to as "input/output module (s) 20" when not particularly being distinguished from each other. While the wiring aggregation apparatus 1 can include one or more subunits 3 as described above, each subunit 3 can also include one or more input/output modules 20. The control module 10 controls an operation of the subunit 3 such that the subunit 3 transmits and receives contact information to and from the subunit 3 in another wiring aggregation apparatus 1. The input/output module 20 is connected to a device, such as a cab or a door (not illustrated), and transmits and receives contact information to and from the device. In the input/output module 20, the number of devices connectable thereto, that is, the maximum number of pieces of contact information that can be handled, is determined in accordance with the type or the like of the input/output module 20. For example, the input/output module 20 is connected to sixteen devices and transmits and receives contact information to and from each of the connected devices. The number of devices to which the input/output module 20 is connectable is sixteen in this example; however, there is no limitation thereto.

Figure 3:
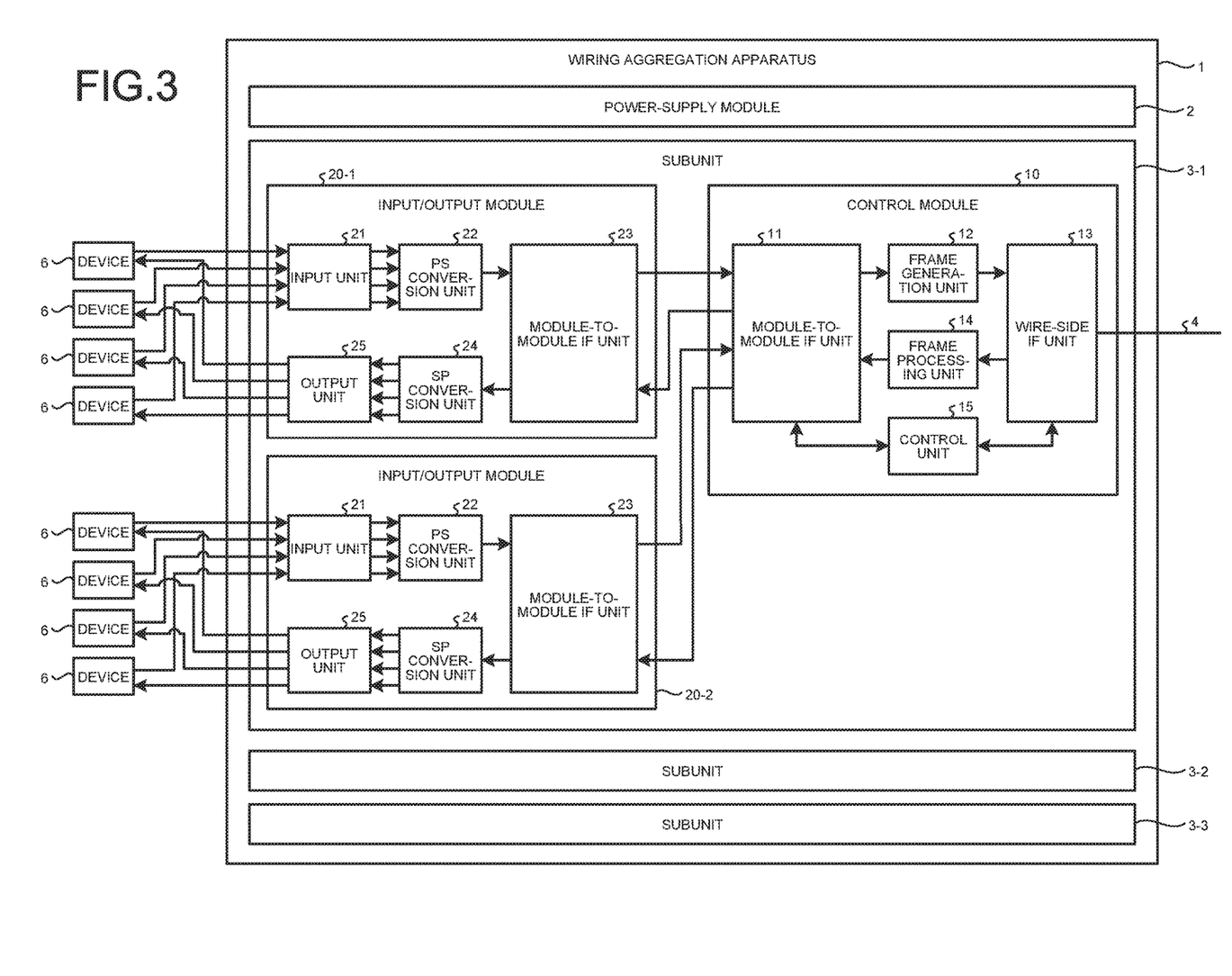
FIG. 3 is a block diagram illustrating an example configuration of the wiring aggregation apparatus.

FIG. 3 is a block diagram illustrating an example configuration of the wiring aggregation apparatus 1 according to the present embodiment. Although only the subunit 3-1 is illustrated in detail and illustrations of the subunits 3-2 and 3-3 are simplified, the subunits 3-2 and 3-3 also have a configuration identical to the subunit 3-1. As described above, the subunit 3-1 includes the control module 10 and the input/output modules 20-1 and 20-2. First, the configuration of the control module 10 is described. The control module 10 includes a module-to-module interface (hereinafter, IF) unit 11, a frame generation unit 12, a wire-side IF unit 13, a frame processing unit 14, and a control unit 15.

The module-to-module IF unit 11 acquires, from the input/output modules 20-1 and 20-2, a plurality of serial signals, each obtained by performing parallel-serial conversion on plural pieces of contact information, and outputs the acquired serial signals to the frame generation unit 12. The serial signals output from the input/output modules 20-1 and 20-2 to the module-to-module IF unit 11, that is, the control module 10, are referred to as first serial signals. Further, the module-to-module IF unit 11 acquires, from the frame processing unit 14, a plurality of serial signals that are extracted from a receive frame received from another wiring aggregation apparatus 1 and are each obtained by the other wiring aggregation apparatus 1 performing parallel-serial conversion on plural pieces of contact information, and it outputs each of the acquired serial signals to a corresponding one of the input/output modules 20-1 and 20-2. The serial signals output from the module-to-module IF unit 11, that is, the control module 10, to the input/output modules 20-1 and 20-2 are referred to as second serial signals.

The frame generation unit 12 arranges each of the first serial signals acquired from the input/output modules 20-1 and 20-2 at the frame position defined by the corresponding input/output module 20 to generate a transmit frame to be transmitted to another wiring aggregation apparatus 1.

Figure 4:
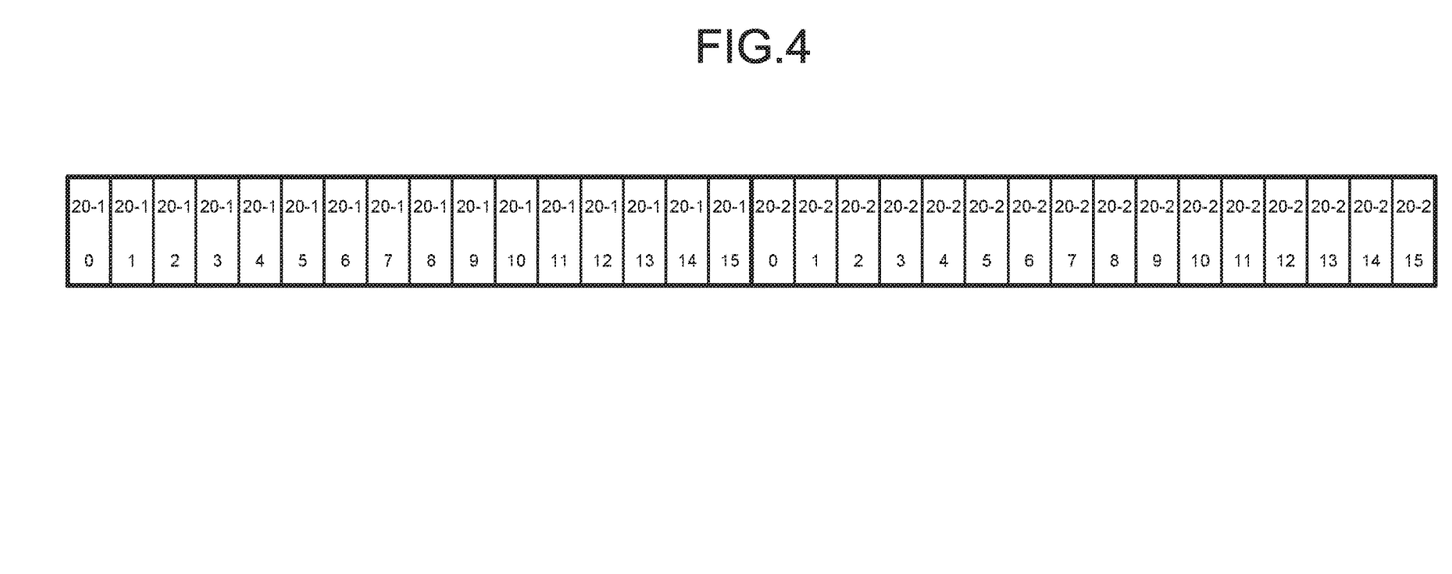
FIG. 4 is a diagram illustrating an example of a frame format of a transmit frame generated by a frame generation unit of a control module.

FIG. 4 is a diagram illustrating an example of a frame format of a transmit frame generated by the frame generation unit 12 of the control module 10 according to the present embodiment. This example assumes that the number of devices 6 that can be connected to each of the input/output modules 20-1 and 20-2 is at most sixteen. The frame generation unit 12 arranges the first serial signal acquired from the input/output module 20-1, that is, contact information on sixteen devices 6, at the frame position from "20-1 0" to "20-1 15" from left to right in the frame format illustrated in FIG. 4. Further, the frame generation unit 12 arranges the first serial signal acquired from the input/output module 20-2, that is, contact information on sixteen devices 6, at the frame position from "20-2 0" to "20-2 15" on the right of the frame position at which contact information on the input/output module 20-1 is arranged. The size of the defined frame position is such a size that the maximum number of pieces of contact information that can be handled by the input/output module 20 from which the first serial signal to be arranged at that frame position is output can be arranged. In a case where only one input/output module 20 is connected to the control module 10, a transmit frame includes one first serial signal obtained from the one input/output module 20.

In a case where the input/output module 20 is actually connected to only eight devices 6 although it can be connected to at most sixteen devices 6, the input/output module 20 generates the first serial signal by using sixteen spaces leaving a space for vacant contact information, as described later. Therefore, contact information on a specific device 6 of a specific input/output module 20 is arranged at a certain specific position in the frame format illustrated in FIG. 4. The certain specific position corresponds to a specific port of the input/output module 20 to which the device 6 is connected. Further, the subunit 3 can include a plurality of input/output modules 20 as described above. For example, by setting the input/output modules 20 as the input/output module 20-1, the input/output module 20-2, . . . in order starting from the input/output module 20 closest to the control module 10 as illustrated in FIG. 2, it is possible to uniquely determine the arrangement order of the input/output modules 20 in a frame format. In this manner, the arrangement order of the input/output modules 20 and the arrangement order of contact information in the first serial signal are preset in the frame format.

Even if an address or the like is not assigned to each input/output module 20 and each piece of contact information, the control module 10 of another wiring aggregation apparatus 1 that has received a frame in the frame format illustrated in FIG. 4 can ascertain to which device 6 of which input/output module 20 contact information at a certain position in the frame corresponds. The example of FIG. 4 assumes that the number of the input/output modules 20 is two; however, even in a case where the number of the input/output modules 20 is three or more, a similar frame format can be used. For example, in a case where the number of the input/output modules 20 is three, it suffices if "20-3 0" to "20-3 15" are further provided to the right side of "20-2 15" in the frame format illustrated in FIG. 4.

Returning to the descriptions of the control module 10, the wire-side IF unit 13 transmits a transmit frame generated by the frame generation unit 12 to another wiring aggregation apparatus 1 connected thereto. More specifically, the wire-side IF unit 13 transmits the transmit frame to the wire-side IF unit 13 of the control module 10 included in the subunit 3 of another wiring aggregation apparatus 1 connected thereto. Further, upon receiving a frame from another wiring aggregation apparatus 1, the wire-side IF unit 13 outputs the receive frame to the frame processing unit 14. The frame received by the wire-side IF unit 13 from another wiring aggregation apparatus 1, that is, the receive frame, has a frame format illustrated in FIG. 4 in a similar manner to the transmit frame.

The frame processing unit 14 extracts, from the receive frame acquired from the wire-side IF unit 13, a plurality of second serial signals arranged at the frame positions defined by the respective input/output modules 20. Specifically, upon acquiring the receive frame in the frame format illustrated in FIG. 4, the frame processing unit 14 extracts the second serial signal including sixteen pieces of contact information from the left as a signal for the input/output module 20-1. Further, the frame processing unit 14 extracts the second serial signal including sixteen pieces of contact information on the right of the second serial signal for the input/output module 20-1, as a signal for the input/output module 20-2. The frame processing unit 14 outputs the second serial signal for the input/output module 20-1 and the second serial signal for the input/output module 20-2 thus extracted to the module-to-module IF unit 11. In a case where the number of the input/output modules 20 connected to the control module 10 is one, the number of the second serial signals included in the receive frame is one.

The control unit 15 controls transmission and reception of a frame, that is, contact information, to and from another wiring aggregation apparatus 1. Specifically, when the subunit 3 including the control module 10 is started, the control unit 15 checks the number of the input/output modules 20 connected to the control module 10 in which the control unit 15 itself is included. Further, the control unit 15 requests information on the number of the connected input/output modules 20 from the control module 10 of another wiring aggregation apparatus 1 connected to the control module 10 in which the control unit 15 itself is included, and acquires the information on the number of the connected input/output modules 20 from the control module 10 of the other wiring aggregation apparatus 1. The control unit 15 then compares the number of the input/output modules 20 connected to the control module 10 in which the control unit 15 itself is included with the number of the input/output modules 20 connected to the control module 10 of the other wiring aggregation apparatus 1. In a case where these numbers match, the control unit 15 executes control to transmit and receive a frame including contact information to and from the other wiring aggregation apparatus 1. In a case where these numbers do not match, the control unit 15 does not transmit and receive a frame including contact information to and from the other wiring aggregation apparatus 1.

Next, a configuration of the input/output module 20 is described. Since the input/output modules 20-1 and 20-2 have the same configuration as described above, the descriptions are made for the input/output module 20-1 as an example. The input/output module 20-1 includes an input unit 21, a parallel-serial (hereinafter, PS) conversion unit 22, a module-to-module IF unit 23, a serial-parallel (hereinafter, SP) conversion unit 24, and an output unit 25.

The input unit 21 collects plural pieces of contact information from the devices 6 and outputs the collected contact information to the PS conversion unit 22. The maximum number of the devices 6 from which the input unit 21 can collect contact information is equal to the maximum number of the devices 6 that are connectable in the input/output module 20.

The PS conversion unit 22 performs parallel-serial conversion on the contact information acquired from the input unit 21 to convert parallel signals to a serial signal, thereby generating the first serial signal. In a case where the number of the devices 6 connected to the input/output module 20 is less than the maximum connectable number, for example, sixteen, the PS conversion unit 22 generates the first serial signal by using sixteen spaces including a vacant space for contact information. Thus, as described above, contact information on a specific device 6 of a specific input/output module 20 can be arranged at a certain specific position in the frame format illustrated in FIG. 4. In a case where, although the input unit 21 can acquire contact information from the devices 6 connected to ports #0 to #15, no devices 6 are connected to ports #4 to #11, for example, the PS conversion unit 22 generates the first serial signal without changing the arrangement of the ports while leaving spaces for contact information for the ports #4 to #11. The PS conversion unit 22 outputs the generated first serial signal to the module-to-module IF unit 23.

Upon acquiring the first serial signal from the PS conversion unit 22, the module-to-module IF unit 23 outputs the first serial signal to the control module 10. Further, upon receiving the second serial signal from the control module 10, the module-to-module IF unit 23 outputs the second serial signal to the SP conversion unit 24.

The SP conversion unit 24 performs serial-parallel conversion on the second serial signal acquired from the module-to-module IF unit 23 to convert it to parallel signals. In this process, the SP conversion unit 2-1 acquires the second serial signal having a size corresponding to sixteen pieces of contact information in the left half or the right half of the received signal in the frame format illustrated in FIG. 4. The SP conversion unit 24 converts the second serial signal having the size corresponding to sixteen pieces of contact information to parallel signals. The SP conversion unit 24 outputs the parallel signals including contact information obtained by serial-parallel conversion to the output unit 25.

The output unit 25 outputs each of the parallel signals including contact information acquired from the SP conversion unit 24, that is, each of the plural pieces of contact information, to a corresponding one of the devices 6. As illustrated in FIG. 3, the device 6 from which the input unit 21 collects contact information and the device 6 to which the output unit 25 outputs contact information are the same. The input/output module 20 transfers contact information between the devices 6, that is, collects and outputs contact information from and to the devices 6.

Figure 5:
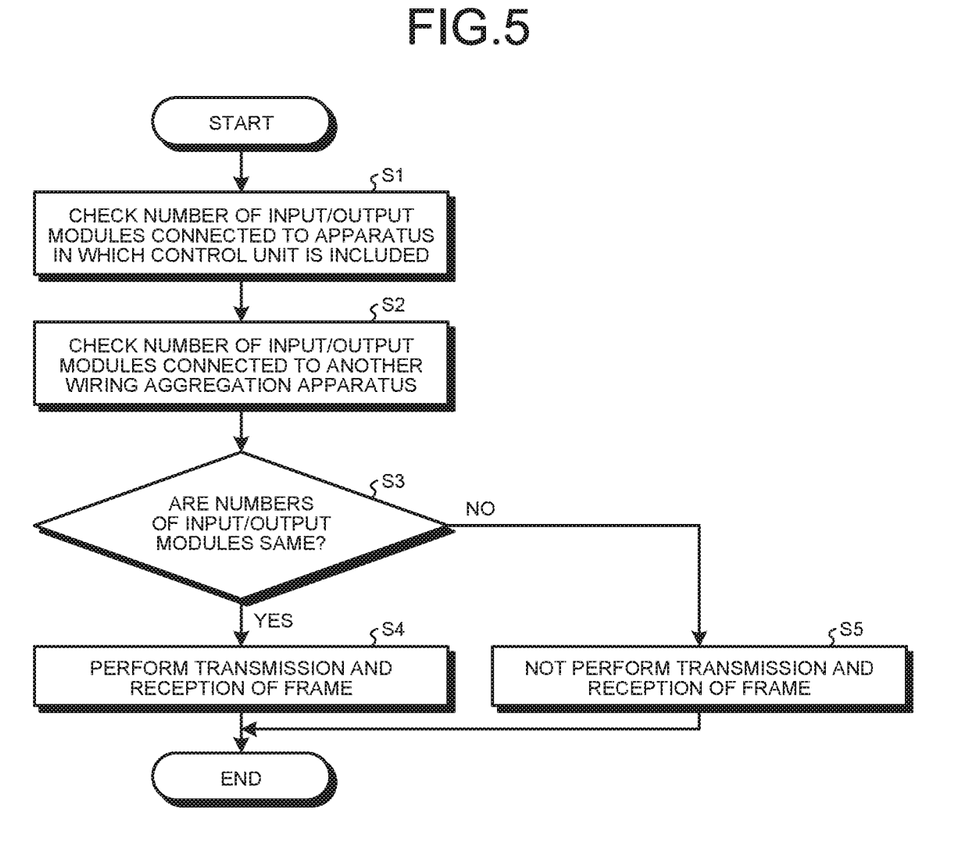
FIG. 5 is a flowchart of an operation of determining whether the wiring aggregation apparatus can transmit and receive a frame including contact information to and from another wiring aggregation apparatus.

Next, an operation of the wiring aggregation apparatus 1 is described. First, a description will be made of an operation of determining whether the wiring aggregation apparatus 1 can transmit and receive a frame including contact information to and from another wiring aggregation apparatus 1. FIG. 5 is a flowchart of an operation of determining whether the wiring aggregation apparatus 1 according to the present embodiment can transmit and receive a frame including contact information to and from another wiring aggregation apparatus 1.

First, in the control module 10, when the subunit 3 including the control module 10 is started, the control unit 15 checks the number of the input/output modules 20 connected to the control module 10 in which the control unit 15 itself is included (Step S1). The control unit 15 checks the number of the connected input/output modules 20 via the module-to-module IF unit 11, for example. The control unit 15 acquires, from the control module 10 of another wiring aggregation apparatus 1, information on the number of the input/output modules 20 connected to the control module 10 of the other wiring aggregation apparatus 1 (Step S2). The control unit 15 acquires the information on the number of the input/output modules 20 from the control module 10 of the other wiring aggregation apparatus 1 via the wire-side IF unit 13, for example.

The control unit 15 compares the number of the input/output modules 20 connected to the control module 10 in which the control unit 15 itself is included with the number of the input/output modules 20 connected to the control module 10 of the other wiring aggregation apparatus 1 (Step S3). In a case where the numbers of the input/output modules 20 match (YES at Step S3), the control unit 15 executes control to transmit and receive a frame including contact information to and from the other wiring aggregation apparatus 1 (Step S4). An operation performed when the wiring aggregation apparatus 1 transmits and receives a frame including contact information to and from the other wiring aggregation apparatus 1 is described separately with reference to another flowchart. In a case where the numbers of the input/output modules 20 do not match. (NO at Step S3), the control unit 15 does not transmit and receive a frame to and from the other wiring aggregation apparatus 1 (Step S5).

When a frame including contact information is transmitted and received between two wiring aggregation apparatuses 1, the wiring aggregation apparatus 1 that has requested information on the number of the input/output modules 20 from the other wiring aggregation apparatus 1 first at Step S2, for example, transmits a frame first. However, the method of determining which wiring aggregation apparatus 1 transmits a frame first is not limited thereto.

Figure 6:
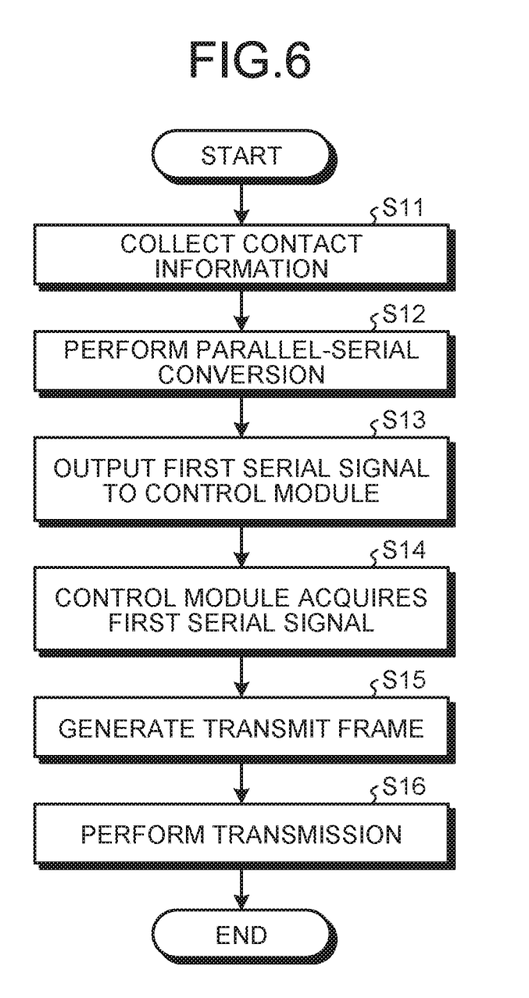
FIG. 6 is a flowchart of an operation performed when the wiring aggregation apparatus transmits a frame including contact information to another wiring aggregation apparatus.

Next, a description is made of an operation performed when the wiring aggregation apparatus 1 transmits contact information collected by itself to another wiring aggregation apparatus 1. FIG. 6 is a flowchart of an operation performed when the wiring aggregation apparatus 1 according to the present embodiment transmits a frame including contact information to another wiring aggregation apparatus 1.

First, in each input/output module 20, the input unit 21 collects plural pieces of contact information from the devices 6 connected thereto (Step S11). The input unit 21 outputs the collected contact information to the PS conversion unit 22. The PS conversion unit 22 performs parallel-serial conversion on the plural pieces of contact information acquired by the input unit 21 to convert parallel signals to a serial signal (Step S12). The PS conversion unit 22 outputs the first serial signal generated by parallel-serial conversion to the module-to-module IF unit 23. The module-to-module IF unit 23 outputs the acquired first serial signal to the control module 10 (Step S13).

In the control module 10, the module-to-module IF unit 11 acquires the first serial signal from each input/output module 20 (Step S14). The module-to-module IF unit 11 outputs the acquired first serial signals to the frame generation unit 12. The frame generation unit 12 generates a transmit frame in the frame format illustrated in FIG. 4 by using the first serial signals acquired from the module-to-module IF unit 11 (Step S15). The frame generation unit 12 outputs the generated transmit frame to the wire-side IF unit 13. The wire-side IF unit 13 transmits the acquired transmit frame to another wiring aggregation apparatus 1 (Step S16).

Figure 7:
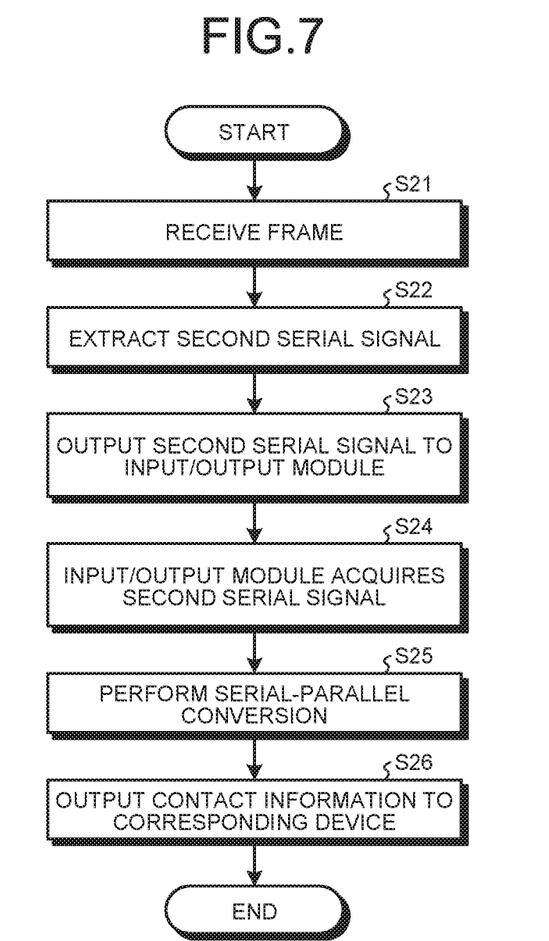
FIG. 7 is a flowchart of an operation performed when the wiring aggregation apparatus receives a frame including contact information from another wiring aggregation apparatus.

Next, a description will be made of an operation performed when the wiring aggregation apparatus 1 receives contact information from another wiring aggregation apparatus 1. FIG. 7 is a flowchart of an operation performed when the wiring aggregation apparatus 1 according to the present embodiment receives a frame including contact information from another wiring aggregation apparatus 1.

First, in the control module 10, the wire-side IF unit 13 receives a frame including contact information transmitted from another wiring aggregation apparatus 1 (Step S21). The wire-side IF unit 13 outputs the receive frame to the frame processing unit 14. The frame processing unit 14 extracts the second serial signal arranged at a defined frame position from the receive frame (Step S22). The frame processing unit 14 outputs the extracted second serial signal to the module-to-module IF unit 11. The module-to-module IF unit 11 outputs the second serial signal acquired from the frame processing unit 14 to the corresponding input/output module 20 (Step S23).

In the input/output module 20, the module-to-module IF unit 23 acquires the second serial signal from the control module 10 (Step S24). The module-to-module IF unit 23 outputs the acquired second serial signal to the SP conversion unit 24. The SP conversion unit 24 performs serial-parallel conversion on the second serial signal acquired from the module-to-module IF unit 23 to convert it to parallel signals (Step S25). The SP conversion unit 24 outputs the parallel signals generated by serial-parallel conversion to the output unit 25. The output unit 25 outputs each of the parallel signals including contact information acquired from the SP conversion unit 24, that is, each of the plural pieces of contact information, to a corresponding one of the devices 6 (Step S26).

In this manner, in the wiring aggregation system 5, in the wiring aggregation apparatuses 1, each subunit 3 included in the wiring aggregation apparatus 1 is connected one-to-one to one of the subunits 3 included in the other wiring aggregation apparatuses 1, converts plural pieces of contact information that are parallel signals to a serial signal, and transmits the serial signal. Therefore, in a railway vehicle with the wiring aggregation apparatus 1 mounted thereon, it is possible to reduce the number of wires for transfer of contact information, as compared with a case in which a wire is required for every piece of contact information. Further, in the wiring aggregation system 5, for example, in a case where the number of the devices 6 mounted on the railway vehicle is increased and contact information to be transferred is increased accordingly or a case where the system in the railway vehicle has been changed, it is possible to deal with this increase, that is, transmit and receive the contact information by increasing the number of the input/output modules 20 in the subunit 3 and without increasing the number of wires and without performing setting of an address or the like. Specifically, even if contact information to be handled is increased in a range that can be covered by the number of the input/output modules 20 that can be increased in each subunit 3, the wiring aggregation apparatus 1 can deal with this increase without increasing the number of wires, that is, the device-to-device cables 4. Further, in the wiring aggregation system 5, wiring can be simplified by using the wiring aggregation apparatus 1, as compared with a case where one wire is prepared for one piece of contact information.

When the wiring aggregation apparatus 1 transmits a frame to another wiring aggregation apparatus 1, the frame generation unit 12 may rewrite contact information at a set frame position in the first serial signal and transmit the rewritten first serial signal. For example, the frame generation unit 12 rewrites contact information on a specific door of a certain vehicle to "open". When the specific door of the certain vehicle is opened as a result of transmission of a frame from the wiring aggregation apparatus 1 that has rewritten the contact information to the other wiring aggregation apparatus 1, a user can easily confirm that wiring is properly connected from the wiring aggregation apparatus 1 to the specific door of the certain vehicle. Regarding a method of rewriting contact information, the control module 10 may be provided with an operation unit (not illustrated in FIG. 3) to allow the user to perform setting or a terminal may be connected to the control module 10 to allow the user to perform setting.

Further, the wiring aggregation apparatus 1 may be configured such that the frame processing unit 14 can check contact information at a set frame position in the second serial signal included in a frame received from another wiring aggregation apparatus 1. Accordingly, by referring to the result of checking by the frame processing unit 14, the user can check the state of connection from the device 6 connected to the other wiring aggregation apparatus 1 to the wiring aggregation apparatus 1 to which the user refers, and can ascertain the content of contact information on the other wiring aggregation apparatus 1. Regarding a method in which the user refers to the result of checking by the frame processing unit 14, the control module 10 may be provided with a display unit (not illustrated in FIG. 3) to allow the user to refer to the result or a terminal may be connected to the control module 10 to allow the user to refer to the result.

In addition, in the wiring aggregation system 5, the subunits 3 of both the wiring aggregation apparatuses 1 connected on a one-to-one basis operate in an identical manner to each other. Therefore, it is unnecessary to set a relation in which one of the wiring aggregation apparatuses 1 is a master and the other is a slave.

Further, while the module-to-module IF unit 11 of the control module 10 and the module-to-module IF unit 23 of each input/output module 20 are directly connected to each other in the wiring aggregation apparatus 1 in the example in FIG. 3, the form of connection between the control module 10 and the input/output module 20 is not limited thereto. The form of connection between the module-to-module IF unit 11 of the control module 10 and the module-to-module IF unit 23 of each input/output module 20 may be a ring network form, for example.

Figure 8:
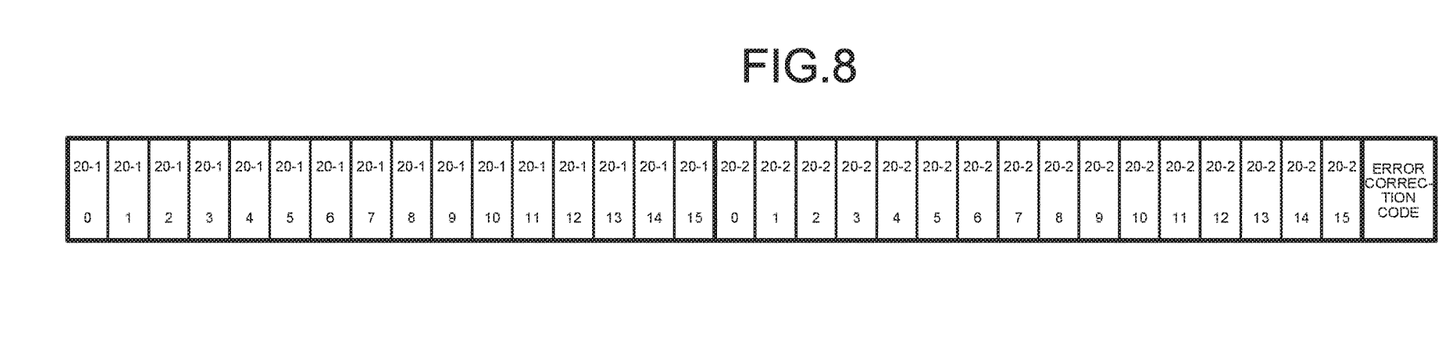
FIG. 8 is a diagram illustrating another example of a frame format of a transmit frame generated by the frame generation unit of the control module.

Furthermore, in a case where a frame is transmitted from the control module 10 in the wiring aggregation apparatus 1, the frame generation unit 12 may add an error correction code to the last of the frame format of the transmit frame illustrated in FIG. 4. FIG. 8 is a diagram illustrating another example of a frame format of a transmit frame generated by the frame generation unit 12 of the control module 10 according to the present embodiment. The frame format illustrated in FIG. 8 is obtained by adding an error correction code at a footer position of the frame format illustrated in FIG. 4. In another wiring aggregation apparatus 1 that has received the frame with the error correction code added thereto, the frame processing unit 14 can perform error detection by using the error correction code. The frame processing unit 14 outputs a frame in which no error has been detected to the input/output module 20 via the module-to-module IF unit 11 as described above, and discards a frame in which an error has been detected and does not output it to the input/output module 20. Therefore, the wiring aggregation apparatus 1 can improve the quality of contact information to be transmitted and received.

Next, a hardware configuration of the wiring aggregation apparatus 1 is described. In the control module 10 included in the wiring aggregation apparatus 1, the module-to-module IF unit 11 and the wire-side IF unit 13 are interface circuits. The frame generation unit 12, the frame processing unit 14, and the control unit 15 are implemented by a processing circuit. That is, the wiring aggregation apparatus 1 includes a processing circuit for transmitting and receiving a frame in which a serial signal including contact information is arranged at a defined frame position. The processing circuit may be a processor that executes a program stored in a memory and the memory, or may be dedicated hardware.

Figure 9:
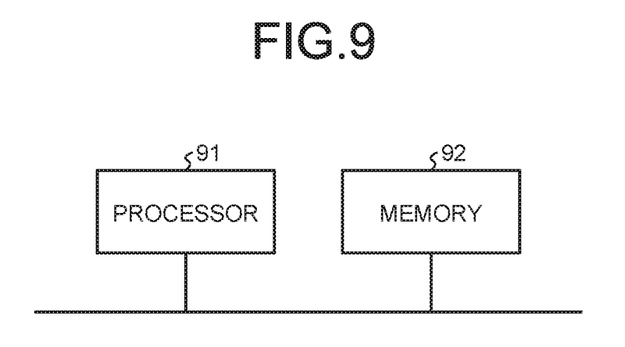
FIG. 9 is a diagram illustrating an example in a case where a processing circuit of the control module included in the wiring aggregation apparatus is configured from a processor and a memory.

FIG. 9 is a diagram illustrating an example in a case where a processing circuit of the control module 10 included in the wiring aggregation apparatus 1 according to the present embodiment is configured from a processor and a memory. In a case where the processing circuit is configured from a processor 91 and a memory 92, respective functions of the processing circuit of the control module 10 are implemented by software, firmware, or a combination of software and firmware. The software or the firmware is described as a program and is stored in the memory 92. The processing circuit implements the functions thereof by reading and executing the program stored in the memory 92 by the processor 91. That is, in the control module 10, the processing circuit includes the memory 92 for storing a program that causes transmission and reception of a frame in which a serial signal including contact information is arranged at a defined frame position to be performed as a result. Further, it can also be said that these programs cause a computer to perform a procedure and a method of the control module 10.

The processor 91 can be, for example, a CPU (Central Processing Unit), a processing device, a calculation device, a microprocessor, a microcomputer, or a DSP (Digital Signal Processor). The memory 92 corresponds to, for example, a nonvolatile or volatile semiconductor memory such as a RAM (Random Access Memory), a ROM (Read. Only Memory), a flash memory, an EPROM (Erasable Programmable ROM), and an EEPROM® (Electrically EPROM), a magnetic disk, a flexible disk, an optical disk, a compact disk, a Minidisk, and a DVD (Digital Versatile Disc).

Figure 10:
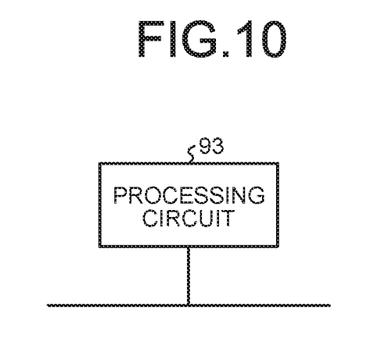
FIG. 10 is a diagram illustrating an example in a case where the processing circuit of the control module included in the wiring aggregation apparatus is configured by dedicated hardware.

FIG. 10 is a diagram illustrating an example in a case where a processing circuit of the control module 10 included in the wiring aggregation apparatus 1 according to the present embodiment is configured by dedicated hardware. When the processing circuit is configured by dedicated hardware, a processing circuit 93 illustrated in FIG. 10 corresponds to, for example, a single circuit, a composite circuit, a programmed processor, a parallel programmed processor, an ASIC (Application Specific Integrated Circuit), an FPGA (Field. Programmable Gate Array), or a combination of these elements. The functions of the control module 10 can be implemented by the processing circuit 93 on a per-function basis or can be implemented collectively by the processing circuit 93.

Respective functions of the control module 10 may be implemented partly by dedicated hardware and partly by software or firmware. In this manner, the processing circuit can implement the respective functions described above by dedicated hardware, software, firmware, or a combination of them.

The hardware configuration of the control module 10 included in the wiring aggregation apparatus 1 has been described. The input/output module 20 is configured in a similar manner. In the input/output module 20, the input unit 21, the module-to-module IF unit 23, and the output unit 25 are interface circuits. The PS conversion unit 22 and the SP conversion unit 24 are implemented by a processing circuit. The processing circuit may be also a processor that executes a program stored in a memory and the memory as illustrated in FIG. 9 or may be dedicated hardware as illustrated in FIG. 10.

As described above, according to the present embodiment, the wiring aggregation apparatus 1 includes one or more subunits 3, and each subunit 3 is connected one-to-one to one of the subunits 3 included in another wiring aggregation apparatus 1. In the subunit 3, the input/output module 20 performs parallel-serial conversion on plural pieces of contact information acquired from the devices 6 to generate a first serial signal including contact information, and the control module 10 arranges the first serial signal at a defined frame position to generate a transmit frame and transmits the generated transmit frame to the subunit 3 in the other wiring aggregation apparatus 1. Further, the control module 10 extracts a second serial signal arranged at a defined frame position from a receive frame acquired from the other wiring aggregation apparatus 1, and the input/output module 20 performs serial-parallel conversion on the second serial signal and outputs each of plural pieces of contact information to a corresponding one of the devices 6. Therefore, in a case where any change has been made to a connection configuration of the devices 6 in a railway vehicle, the wiring aggregation apparatus 1 can transmit and receive contact information without performing setting and while reducing or preventing an increase in the number of wires.

The configurations described is the above embodiment are only examples of an aspect of the present invention. The configurations can be combined with other well-known techniques, and part of each of the configurations can be omitted or modified without departing from the scope of the present invention.

REFERENCE SIGNS LIST 1, 1-1 to 1-4 wiring aggregation apparatus, 2 power-supply module, 3-1 to 3-3 subunit, 4 device-to-device cable, 5 wiring aggregation system, 6 device, 10 control module, 11, 23 module-to-module IF unit, 12 frame generation unit, 13 wire-side IF unit, 14 frame processing unit, 15 control unit, 20-1, 20-2 input/output module, 21 input unit, 22 PS conversion unit, 24 SP conversion unit, 25 output unit.

The invention claimed is:

1. A wiring aggregation apparatus comprising at least one subunit of a railroad system, wherein
the subunit includes:
at least one input/output module to collect plural pieces of contact information from a plurality of devices, perform parallel-serial conversion on the plural pieces of contact information to obtain a first serial signal including contact information, and output, to a control module, the first serial signal; and to acquire a second serial signal including contact information from the control module, perform serial-parallel conversion on the second serial signal to obtain plural pieces of contact information, and output, to a corresponding one of the devices, each of the plural pieces of contact information; and
the control module to generate a transmit frame by arranging the first serial signal acquired from the input/output module at a defined frame position, to transmit the generated transmit frame to another wiring aggregation apparatus connected to the control module, to extract the second serial signal arranged at a defined frame position from a receive frame acquired from the another wiring aggregation apparatus, and to output the extracted second serial signal to the input/output module corresponding to the second serial signal, and
the control module checks the number of input/output modules connected to the control module of the wiring aggregation apparatus and the number of input/output modules connected to a control module of the another wiring aggregation apparatus,
wherein in a case where the number of the devices connected to the input/output module is less than the maximum connectable number, the input/output module generates the first serial signal by using spaces for the maximum connectable number including a vacant space for the contact information.

2. The wiring aggregation apparatus according to claim 1, wherein
in a case where the input/output module included in the subunit is a plurality of input/output modules,
the control module generates the transmit frame by arranging each of a plurality of the first serial signals acquired from the input/output modules at a frame position defined by a corresponding one of the input/output modules, and extracts a plurality of the second serial signals arranged at frame positions defined by the respective input/output modules from the receive frame, and outputs each of the extracted second serial signals to a corresponding one of the input/output modules.

3. The wiring aggregation apparatus according to claim 2, wherein the control module and the input/output modules are connected in a ring network form.

4. The wiring aggregation apparatus according to claim 1, wherein a size of the defined frame position is a size that allows a maximum number of pieces of contact information capable of being handled by the input/output module from which the first serial signal or the second serial signal arranged at the frame position is output to be arranged.

5. The wiring aggregation apparatus according to claim 1, wherein in a case where the number of the input/output modules connected to the control module of the wiring aggregation apparatus is equal to the number of the input/output modules connected to the control module of the another wiring aggregation apparatus, the control module of the wiring aggregation apparatus transmits and receives a frame to and from the another wiring aggregation apparatus, and in a case where the number of the input/output modules connected to the control module of the wiring aggregation apparatus is different from the number of the input/output modules connected to the control module of the another wiring aggregation apparatus, the control module of the wiring aggregation apparatus does not transmit and receive a frame to and from the another wiring aggregation apparatus.

6. The wiring aggregation apparatus according to claim 1, wherein the control module rewrites contact information at a set frame position in the first serial signal and transmits the rewritten first serial signal.

7. The wiring aggregation apparatus according to claim 1, wherein the control module checks contact information at a set frame position in the second serial signal.

8. The wiring aggregation apparatus according to claim 1, wherein the control module transmits the transmit frame with an error correction code added thereto and performs error detection on the receive frame by using an error correction code added to the receive frame.

9. A wiring aggregation system comprising a plurality of the wiring aggregation apparatuses according to claim 1, wherein a subunit in each of the wiring aggregation apparatuses is connected one-to-one to a subunit in another of the wiring aggregation apparatuses.

10. A contact information transfer method in a wiring aggregation apparatus comprising at least one subunit of a railroad system, the subunit comprising at least one input/output module and a control module, the method being performed by the subunit comprising:
checking the number of input/output modules connected to the control module of the wiring aggregation apparatus and the number of input/output modules connected to a control module of another wiring aggregation apparatus connected to the control module of the wiring aggregation apparatus;
outputting, to the control module, a first serial signal including contact information obtained by performing parallel-serial conversion on plural pieces of contact information collected from a plurality of devices;
generating a transmit frame by arranging the first serial signal acquired from the input/output module at a defined frame position and transmitting the generated transmit frame to the another wiring aggregation apparatus;
extracting a second serial signal including contact information arranged at a defined frame position from a receive frame acquired from the another wiring aggregation apparatus and outputting the extracted second serial signal to the input/output module corresponding to the second serial signal; and
outputting, to a corresponding one of the devices, each of plural pieces of contact information obtained by performing serial-parallel conversion on the second serial signal acquired from the control module,
wherein in a case where the number of the devices connected to the input/output module is less than the maximum connectable number, generating, by the input/output module, the first serial signal by using spaces for the maximum connectable number including a vacant space for the contact information.

* * * * *